United States Patent
Skitt

(10) Patent No.: US 8,883,684 B2
(45) Date of Patent: Nov. 11, 2014

(54) PROCESS FOR TREATING WITH A CHEMICAL COMPOUND A BODY OF WATER USED IN AQUACULTURE

(75) Inventor: Paul Skitt, Liverpool (GB)

(73) Assignee: Solvay SA, Brussels (BE)

(*) Notice: Subject to any disclaimer, the term of this patent is extended or adjusted under 35 U.S.C. 154(b) by 3 days.

(21) Appl. No.: 13/395,490

(22) PCT Filed: Sep. 10, 2010

(86) PCT No.: PCT/EP2010/063320
§ 371 (c)(1),
(2), (4) Date: Mar. 12, 2012

(87) PCT Pub. No.: WO2011/032894
PCT Pub. Date: Mar. 24, 2011

(65) Prior Publication Data
US 2012/0172221 A1    Jul. 5, 2012

(30) Foreign Application Priority Data

Sep. 15, 2009 (EP) .................................... 09170361

(51) Int. Cl.
A01N 59/00 (2006.01)
A01K 63/04 (2006.01)
A01P 1/00 (2006.01)
A01P 3/00 (2006.01)
A01P 13/00 (2006.01)

(52) U.S. Cl.
CPC ................................ A01K 63/04 (2013.01)
USPC ........................................ 504/150; 424/616

(58) Field of Classification Search
CPC ............ B01F 5/106; B01F 5/043; B01F 5/10
See application file for complete search history.

(56) References Cited

U.S. PATENT DOCUMENTS

| 3,304,564 A | 2/1967 | Green et al. |
| 4,747,958 A | 5/1988 | Eberhardt |
| 4,860,925 A | 8/1989 | Carrillon |
| 5,313,911 A * | 5/1994 | Thomassen et al. .......... 119/231 |
| 5,355,838 A | 10/1994 | Thomassen et al. |
| 5,484,525 A | 1/1996 | Mowka |
| 6,655,401 B2 | 12/2003 | Sand et al. |
| 7,086,610 B2 | 8/2006 | Hubmann et al. |
| 2008/0210639 A1 | 9/2008 | Leistner |

FOREIGN PATENT DOCUMENTS

| DE | 226753 A1 | 9/1985 |
| GB | 2195221 A * | 4/1988 |
| GB | 2260703 A | 4/1993 |
| GB | 2271046 A | 4/1994 |

(Continued)

OTHER PUBLICATIONS

KTH, "Tank Mixing Eductors", Apr. 3, 2007, <http://www.kthsales.com/website/vendors/Eductors/mixing_eductors.htm>, p. 1-3.*

(Continued)

*Primary Examiner* — Tracy Vivlemore
*Assistant Examiner* — Monica Shin
(74) *Attorney, Agent, or Firm* — Xuping Fu

(57) ABSTRACT

A process for treating with at least one chemical compound a body of water comprising at least one living organism selected from fish, mollusks, crustaceans and aquatic plants, such process comprising adding the chemical compound to the body of water and agitating the water with an agitation system comprising a pump and at least one submerged outlet equipped with an eductor nozzle.

12 Claims, 3 Drawing Sheets

(56) References Cited

FOREIGN PATENT DOCUMENTS

| GB | 2322367 A | 8/1998 |
|----|-----------|--------|
| WO | WO 9823544 A1 * | 6/1998 |
| WO | WO 0101765 A1 | 1/2001 |
| WO | WO 03086066 A1 | 10/2003 |
| WO | WO 2009036558 A1 | 3/2009 |

OTHER PUBLICATIONS

Meherwan, P. Boyce, et al—"Transport and Storage of Fluids", Section 10 of Perry's Chemical Engineers' Handbook, Eighth Edition (Robert Perry; Don Green, Eds.), McGraw-Hill, 2008, , pp. 10-1 to 10-111; 111 pgs.

* cited by examiner

PROCESS FOR TREATING WITH A CHEMICAL COMPOUND A BODY OF WATER USED IN AQUACULTURE

CROSS-REFERENCE TO RELATED APPLICATIONS

The present application is a U.S. national stage entry under 35 U.S.C. §371 of International Application No. PCT/EP2010/063320 filed Sep. 10, 2010, which claims the benefit of the European application no. 09170361.1 filed on Sep. 15, 2009, the whole content of this application being herein incorporated by reference for all purposes.

TECHNICAL FIELD OF THE INVENTION

The present invention relates to a process for treating with a chemical compound a body of water used in aquaculture. In particular, it relates to a process for treating with a chemical compound a body of water comprising living organisms selected from fish, mollusks, crustaceans and aquatic plants.

BACKGROUND OF THE INVENTION

In the field of aquaculture, it is usual to treat the bodies of water containing the cultured or bred species with various treatment agents to improve the quality of the water. It is also usual to treat the bodies of water to indirectly treat the living organisms cultured or bred inside the bodies of water, for example to fight various diseases or parasites. For instance, it is known to control parasites such as *Gyrodactilus* sp., *Ichthyobodo* sp. (or *Costia* sp.) or salmon lice (*Lepeophtheirus salmonis*) in the breeding of fish by treating a body of water containing the fish with an active chemical compound such as hydrogen peroxide, sodium percarbonate, organo phosphates, pyrethroids or peracetic acid.

As disclosed in U.S. Pat. No. 5,355,838, a method for preventing fish-borne parasites from spreading to another area of water without such parasites comprises forcing all fish which are going to pass into this other area of water through a bath of water containing an active substance which kills or removes the fish-borne parasites without killing or seriously injuring the fish.

Another example is disclosed in U.S. Pat. No. 5,313,911 wherein a method for controlling parasites in fish breeding comprises screening off the water containing fish and parasites so that the exchange with the surrounding water is essentially stopped and supplying the water in which fish are maintained with an amount of hydrogen peroxide from 1.2 to 2.9 g/l during a definite period of time. According to U.S. Pat. No. 5,313,911, it has proved essential that the concentration gradients of the hydrogen peroxide in the water be minimized. It is thus advisable to add the hydrogen peroxide in the form of an aqueous solution having a concentration from 10 to 70% through a pipe or a hose having a plurality of nozzles disposed below the water surface.

However, this process has the disadvantage that the fish which are located close to the nozzles are still in contact with a very high concentration of hydrogen peroxide while the fish which are located far from the nozzles will probably not be in contact with an effective amount of hydrogen peroxide during the recommended period. And if the process is conducted using very low concentrations of hydrogen peroxide, other drawbacks will arise such as the necessity to move big amounts of dilute solution on the treatment site or the necessity to pre-dilute the hydrogen peroxide solution in a dosing chamber. Furthermore, using a very dilute hydrogen peroxide solution means to add a huge amount of said solution to the body of water, which is usually a substantially enclosed water system and has therefore a finite volume.

SUMMARY OF THE INVENTION

The purpose of the present invention is to provide a process for treating with a chemical compound a body of water used in aquaculture, especially a body of water comprising living organisms such as fish, mollusks, crustaceans and/or aquatic plants, which does not present the above disadvantages and which enables the treatment of the body of water with an improved accuracy, efficiency and safety towards the living organisms.

The term "aquaculture" designates the farming of freshwater and saltwater organisms including fish, mollusks, crustaceans and aquatic plants. Aquaculture implies the cultivation of aquatic populations under controlled conditions. Aquaculture includes mariculture which refers to aquaculture practiced in marine environments. Particular kinds of aquaculture include algaculture, fish farming, shrimp farming, oyster farming and the growing of cultured pearls.

The present invention therefore relates to a process for treating with at least one chemical compound a body of water comprising at least one living organism selected from fish, mollusks, crustaceans and aquatic plants, said process comprising adding the chemical compound to the body of water and agitating the water with an agitation system comprising a pump and at least one submerged outlet equipped with an eductor nozzle.

BRIEF DESCRIPTION OF THE DRAWINGS

For a detailed description of preferred embodiments of the invention, reference will now be made to the accompanying drawings, in which:

FIG. 4 corresponds to section "a-a" of the plan view of FIG. 3; and FIG. 5 corresponds to section "b-b" of the plan view of FIG. 3.

DETAILED DESCRIPTION

Figure 1:
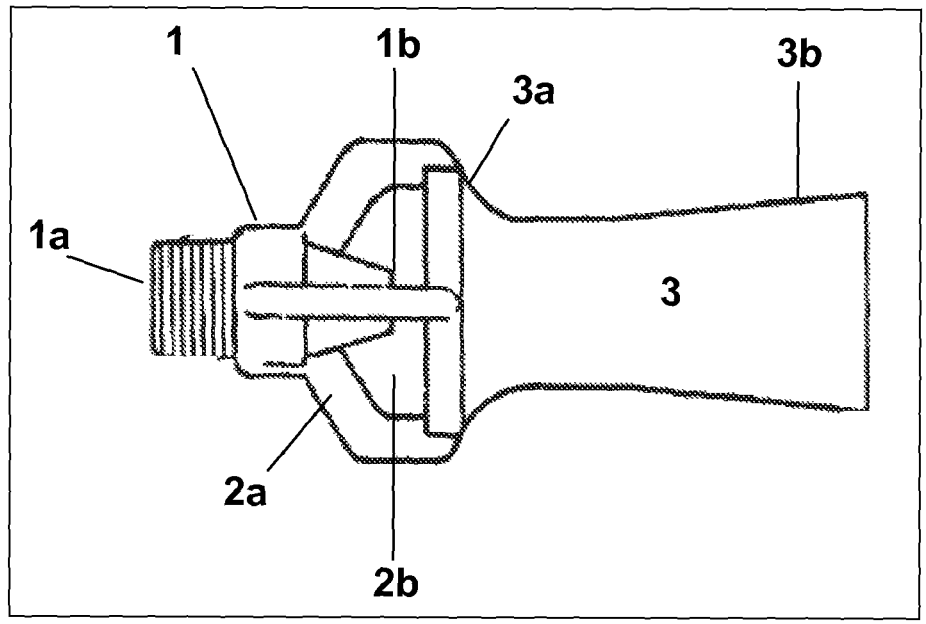
FIG. 1 illustrates an especially preferred eductor nozzle.

One of the essential features of the present invention resides in the use of an agitation system comprising at least one submerged outlet equipped with an eductor nozzle. According to the present invention, the term "eductor nozzle" means that a part of the water present in the body of water to be treated is sucked through a part of the eductor nozzle and is discharged with the outlet flow coming from the agitation system, further diluting it.

Indeed, it has been surprisingly found that many advantages are linked to the use of an agitation system comprising submerged outlets equipped with eductor nozzles. First, such agitation system allows a better dispersion and mixing of the chemical compound into the body of water, which means a more even concentration of the chemical compound through the whole body of water which ensures that the cultured species receive an accurate dose of the chemical compound. Especially, by using the agitation system according to the present invention, hot spots and cold spots can be limited or even avoided, i.e. areas with a concentration higher than the required level and areas with a concentration lower than the required level. This advantage is important as such hot spots and cold spots are critical to the health of the living organisms cultivated or bred in aquaculture. Indeed, the presence of hot spots means that the living organisms are subjected to a high concentration of chemical compound, which can be detrimental or even lethal, while the presence of cold spots means that the living organisms are not treated by the chemical compound or are in contact with a dose which is not effective. The process of the present invention is thus more effective.

Another advantage of the agitating system used in the process of the present invention is that there is substantially no surface disturbance of the body of water, which effect is a reduction of airborne fume emissions by about 90% due to no aerosol effect entraining part of the chemical in the atmosphere. The avoidance of such an aerosol effect means a reduced toxicity for people using this system. Indeed, many of the chemicals used for the treatment of bodies of water in aquaculture can exhibit a certain toxicity towards the people using them and located close to the treated body of water during its agitation.

The process of the present invention is thus safer both for the living organisms cultured or bred in the treated body of water, and for the people located close to the body of water during the treatment with the chemical compound.

Furthermore, the agitating system according to the present invention, comprising submerged outlets equipped with eductor nozzles, produces a sweeping effect which avoids the so-called burning of the chemical compound on the living organisms cultivated or bred in the treated bodies of water, for example on the skin of the fish. This sweeping effect allows reducing the potential toxicity of the chemical compounds used in the treatment of the water.

Another advantage of the agitating system used in the process of the present invention is the reduction and even the avoidance of settlement of wastes and sludge, especially in or near the eductor nozzles. Thus, no strainers are required and the eductor nozzles will not be blocked or need cleaning at regular intervals.

In the present invention, the eductor nozzle comprises at least two parts, a nozzle and a body, the body comprising an inlet eductor part and an outlet diffuser part. The nozzle comprises an inlet part and an outlet part, the outlet part being directed towards the center of the inlet part of the body. The nozzle preferably has a rotational symmetry around the flow direction. In a preferred embodiment, at least the diameter of the outlet part of the nozzle is smaller than the diameter of the inlet part of the body. The body comprises an inlet part (eductor part) and an outlet part, the outlet part being diverging (diffuser part). Preferably, the inlet part of the body is converging and the outlet part of the body is diverging. The body usually has a rotational symmetry around the flow direction. In the present invention, the inlet part and the outlet part of the body are in fluid communication with the surrounding fluid, i.e. with the water present in the body of water to be treated. The gap between the nozzle outlet and the body inlet defines at least one opening, in particular a suction opening. In an especially preferred embodiment, the eductor nozzle comprises mechanical fixing means to fix the nozzle to the body, said mechanical fixing means being designed such that they do not prevent the fluid communication between the body inlet and the surrounding fluid. In particular, suction openings are located in the periphery of the outlet part of the nozzle and of the inlet part of the body. The openings are limited by the outlet part of the nozzle, the inlet part of the body, and the mechanical fixing means. FIG. 1 illustrates an especially preferred eductor nozzle.

According to the present invention, the eductor nozzles are designed such that part of the water present in the body of water to be treated is sucked and is discharged with the outlet flow coming from the pump of the agitation system, further diluting it. The eductor nozzles of the present invention typically comprise:

a nozzle part through which exits the pumped liquid, an eductor part (inlet part of the body) through which part of the water present in the body of water to be treated is sucked via the at least one suction opening, said flow of liquid being called induced liquid, and a diffuser part (outlet part of the body) through which passes the total outlet flow, corresponding to the pumped liquid and the induced liquid.

Figure 2:
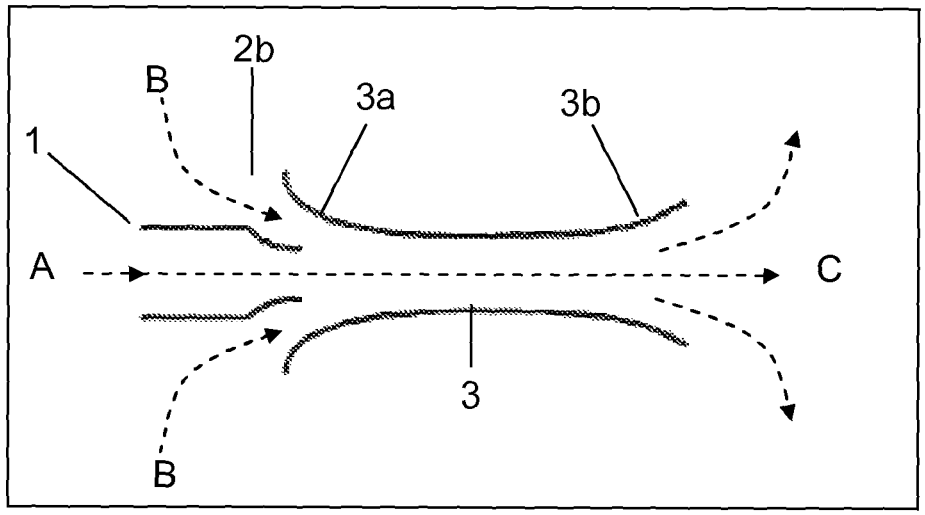
FIG. 2 illustrates the principle of operation of an eductor nozzle.

Especially, the liquid pumped through the agitation system via the pump (pumped liquid) exits the nozzle part of the eductor nozzle (through the nozzle outlet part) at a high velocity, drawing an additional flow of the surrounding water, via a venturi effect, through the at least one suction opening and further through the eductor part (inlet part of the body) of the eductor nozzle. Indeed, the hydraulic pressure gradient around the high velocity nozzle is such that the surrounding water (present into the body of water to be treated) is sucked into the venturi. This additional flow, also called induced liquid, mixes with the pumped liquid into the diffuser part of the eductor nozzle (outlet part of the body) and multiplies its volume thus diluting it. The agitation system of the present invention converts a high pressure, high velocity, low volume flow (pumped liquid) into a low pressure, low velocity, high volume flow (total outlet flow, equal to pumped liquid plus induced liquid). FIG. 2 illustrates the principle of operation of an eductor nozzle. The pumped liquid can come from the body of water to be treated or can be discharged from another body of liquid such as another body of water, a storage container or a dosing chamber.

The eductor nozzles used in the process of the present invention are typically designed such that the total outlet flow rate exiting the eductor nozzle is from 1.5 to 10 times greater than the pumped liquid flow rate exiting the nozzle part of the eductor nozzle, preferably from 2 to 8 times greater, more preferably from 4 to 6 times greater, for example around 5 times greater.

In the process of the invention, the agitation system usually comprises more than one submerged outlet equipped with an eductor nozzle. Advantageously, the agitation system comprises from 1 to 50 submerged outlets equipped with an eductor nozzle per square meter of the upper surface area of the body of water to be treated, preferably from 1 to 10 per square meter, more preferably from 1 to 5 per square meter, for instance about 3 per square meter.

According to the present invention, the body of water to be treated may be any kind of body of water used in aquaculture. Preferably, the body of water is a substantially enclosed water system. Examples of bodies of water are cages, pens, tanks, wells of well boats, tarpaulins, channels and ponds.

The agitation system used in the process of the present invention may be land-based, for example on a fish farm or connected to a trailer so that it can be readily transported from one site to another. The agitation system may also be mounted on a boat or connected to a boat. If the agitation system is mounted on a boat or connected to a boat, the body of water to be treated can be on the boat, such as the well of a well boat or a tank, or outside the boat, such as a cage, a pen, a tarpaulin, a channel or a pond.

The pump may be any kind of pump known in the art, for example a centrifugal pump.

In a first embodiment of the present invention, the pump may be a submersible electric pump which is submersed in the body of water to be treated. According to this first embodiment, the pump is usually equipped with an inlet or inlet pipe through which water is withdrawn from the body of water to be treated and with an outlet pipe through which the water is returned to the body of water to be treated, via at least one submerged outlet equipped with an eductor nozzle. The water pumped through the inlet or inlet pipe is generally pressurized due to the action of the pump.

In a second embodiment of the present invention, the pump may be located out of the body of water to be treated, for example on a boat, on the land or on a trailer. According to this second embodiment, the pump is usually equipped with an inlet pipe through which water is withdrawn from the body of water to be treated, or from another body of water such as a body of clean water. The pump can also be used to pump liquid contained in a storage container or in a dosing chamber. Mixtures of these liquids can also be pumped. The pump is also generally equipped with an outlet pipe through which the pumped liquid is returned or sent to the body of water to be treated, via at least one submerged outlet equipped with an eductor nozzle. The liquid pumped through the inlet pipe is generally pressurized due to the action of the pump.

In a third embodiment, the agitation system may comprise at least two pumps, for example one pump being a submersible electric pump submersed in the body of water to be treated, and a second pump being located out of the body of water to be treated and connected to said body of water, to another body of water, to a storage container and/or to a dosing chamber via an inlet pipe.

The agitating system of the present invention is usually designed to discharge a total outlet flow from 1 to 5000 liters per minute (l/min), in particular from 5 to 2000 liters per minute. Of course, the total outlet flow has to be adapted to the volume of the body of water to be agitated. The agitating system of the present invention can typically be used for agitating bodies of water from $0.5\,m^3$ to $10000\,m^3$, preferably from 1 to $5000\,m^3$, more preferably from 1 to $2000\,m^3$, for example about 500 or $1000\,m^3$. The power of the pump and number and size of the eductor nozzles are generally adapted to allow the whole content of the body of water to pass through the agitating system, via the total outlet flow, in about 1 minute to 24 hours, preferably in about 5 minutes to 12 hours, more preferably in about 10 minutes to 8 hours, for example in about 20 minutes to 2 hours.

According to the present invention, the chemical compound to be added to the body of water may be any kind of chemical or pharmaceutical compound useful in aquaculture. For example, said chemical compound may be a microbicide such as a bactericide or a viricide, a parasiticide, a fungicide, an algaecide, or combinations thereof. For instance, peroxygen compounds, particularly hydrogen peroxide or sources thereof such as sodium percarbonate, sodium perborate mono and tetrahydrates and hydrogen peroxide adducts such as urea hydrogen peroxide, inorganic peroxides such as calcium peroxide, magnesium peroxide or mixed calcium-magnesium peroxide, and mixtures thereof can be used to increase the oxygen level of the water. Hydrogen peroxide, sodium percarbonate, calcium peroxide, magnesium peroxide, mixed calcium-magnesium peroxide, ε-phthalimido-peroxy-hexanoic-acid (PAP), organo phosphates, pyrethroids, peracetic acid or mixtures thereof can also be used as active chemical compounds, especially as microbicides, parasiticides, fungicides and/or algaecides.

The chemical compound is usually added to the body of water to be treated in an effective amount, depending on the nature of the chemical compound, depending on the toxicity of the chemical compound towards the living organisms enclosed in the body of water, and depending on the problem to be solved. Such amount could for example be as low as 1 ppm or as high as several % by weight of the body of water to be treated.

In the process of the invention, the chemical compound may be added directly, manually or via a pump or a combination thereof, to the body of water to be treated. The direct addition of the chemical compound may be followed by the agitation of the body of water, or the addition of the chemical compound may take place at the same time as the agitation of the body of water, or the addition of the chemical compound may take place while the agitation of the body of water has already begun. The chemical compound may also be added to the body of water to be treated via the agitation system, said agitation system being equipped with dosing means for adding the chemical compound to the pumped liquid. It is possible to add the chemical compound via dosing means connected to the agitation system upstream or downstream the pump. For example, the chemical compound may be fed from a storage container into the inlet pipe of the pump, the storage container being connected to the inlet pipe by means of a supply line. Said supply line may contain an adjustable flow control valve. It is also possible to use a venturi to withdraw the chemical compound from its storage container, the chemical compound flowing from the storage container under the suction effect generated by the high-pressure flow of the water through the inlet pipe or the outlet pipe. The chemical compound is preferably added to the body of water to be treated via the agitation system.

In the process of the present invention, the chemical compound may be added batchwise. In a batchwise treatment, if the chemical compound is added via the agitation system, the agitation system is advantageously designed such that it allows the addition of the chemical compound in 30 seconds to 30 minutes, preferably in 1 minute to 10 minutes, for example in about 3 to 6 minutes. Such a batchwise treatment is advisable for treatments necessitating a contact with the chemical compound at a certain concentration during a limited amount of time, for instance for treating fish with an effective amount of parasiticide such as hydrogen peroxide. The chemical compound can also be added continuously to the body of water to be treated, by the continuous addition of small amounts of the chemical compound, for example by the continuous addition of small amounts of peracetic acid acting as a disinfectant.

In a preferred embodiment, the agitation system used in the process of the present invention further comprises dosing means allowing the in-line addition of the chemical compound via the agitation system, especially its addition to the pumped liquid prior to the sending of the pumped liquid to the body of water to be treated. It is also possible to add the chemical compound via a dosing chamber allowing its pre-dilution and/or the preparation of a formulation comprising more than one chemical compound. Thus, the agitation system used in the process of the present invention may further comprise a dosing chamber between the storage container and the supply line intended to send the chemical compound to the pumped liquid. A dosing chamber consists in a substantially enclosed water system comprising water and a certain amount of the chemical compound, in a pre-diluted form. The possibility of in-line addition of the chemical compound is especially advantageous as it allows the replacement of time and labor intensive manual processes prone to errors. The use of a dosing chamber is also advantageous as it allows the addition of the chemical compound in a pre-diluted form to the body of water to be treated, therefore more improving the safety of the process towards the living organisms cultivated or bred in the treated body of water.

In a further preferred embodiment, the agitation system is arranged for automatic operation under the control of a sensor or a sampling device located inside the body of water to be treated, which senses the level of the chemical compound in the body of water or of other parameters and causes the chemical compound supply to be actuated when the measured level of the chemical compound and/or of the other parameters change. Said sensor and/or sampling device are typically connected to an analytical device, usually located outside of the body of water. The dosing control can be adjusted according to the parameters measured. Said in-line monitoring system has the advantage to enhance the treatment control and the safety of the treatment process towards the living organisms present in the body of water.

Further to the advantages already mentioned, the process of the present invention is also highly flexible. Indeed, the process of the present invention can be used to apply various treatments, based on chemical compounds in various forms. For example, a liquid or a solid chemical compound, optionally premixed in a liquid, can be added directly to the body of water to be treated. It is also possible to add a liquid chemical compound or a chemical compound in solution or in suspension in a solvent through the agitation system, optionally via a dosing chamber which allows the pre-dilution of the chemical compound. The system of the present invention can also be used to do a wash through of the body of water to be treated or that has been treated, with clean water. The process of the invention is also suitable for multistage treatments, for instance a first treatment with a first chemical compound, a wash through of the body of water with clean water, a second treatment with a second chemical compound, and an optional further wash through. Such a high flexibility, which allows the use of various chemical compounds to treat the same body of water, also has the advantage of helping to reduce the resistance of the bacteries, virus, parasites, fungus, algae etc to be treated, compared to processes designed for a specific kind of treatment.

The present invention also relates to the use of this process in aquaculture and especially in fish farming.

FIG. 1 illustrates an especially preferred eductor nozzle. The eductor nozzle comprises a nozzle (1), mechanical fixing means (2a) defining suction openings (2b), and a body (3). The nozzle (1) comprises an inlet part (1a) and an outlet part (1b) and has a rotational symmetry around the flow direction. The body (3) comprises a converging inlet part (eductor part, 3a) and a diverging outlet part (diffuser part, 3b) and has a rotational symmetry around the flow direction. The mechanical fixing means (2a) fix the nozzle (1) to the body (3) and define openings (2b), constituted by the nozzle outlet (1b), the body inlet (3a) and the mechanical fixing means (2a), said openings allowing the inlet part of the body (3a) to be in fluid communication with the water to be treated.

FIG. 2 illustrates the principle of operation of an eductor nozzle. A flow of pumped liquid (A) is discharged through the nozzle (1). Said flow of pumped liquid (A) has a high velocity and draws, according to the venturi principle, an additional flow of the surrounding water, called induced flow or induced liquid (B), through the openings (2b) located around the eductor part (3a) of the eductor nozzle. The induced liquid (B) joins the pumped liquid (A) into the body (3) of the eductor nozzle where both liquids are mixed. The mixture comprising the pumped liquid (A) and the induced liquid (B) corresponds to the total outlet flow (C) which is discharged from the diffuser part (3b) into the body of water to be treated.

Figure 3:
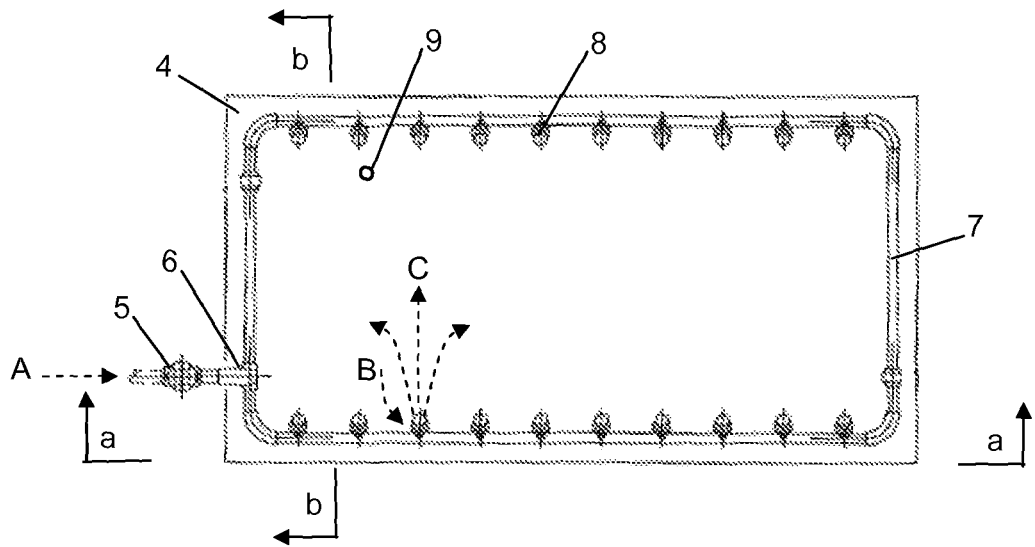
FIGS. 3 to 5 illustrates a tank equipped with an agitation system according to the present invention, in which FIG. 3 corresponds to a plan view.
Figure 4:
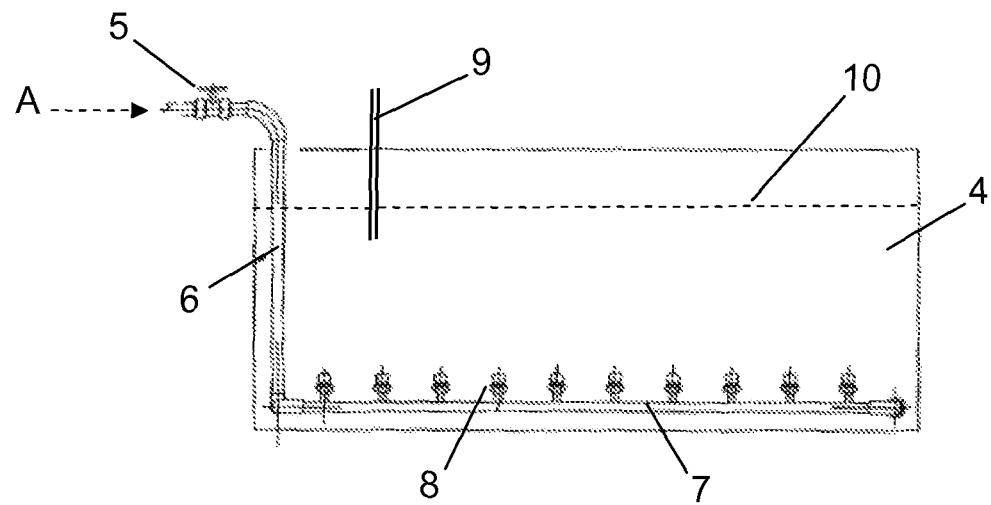
Figure 5:
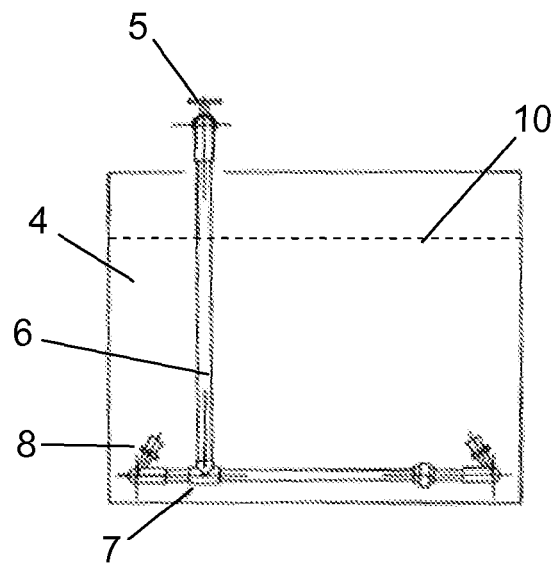

FIGS. 3 to 5 illustrates a tank (4) equipped with an agitation system according to the present invention. FIG. 3 is plan view. FIG. 4 corresponds to the section "a-a" of the plan view. FIG. 5 corresponds to the section "b-b" of the plan view. The tank (4) comprises water and defines a substantially enclosed body of water. The agitation system comprises a pump (not shown, located outside the tank) connected via a ball valve (5) to a vertical pipe (6) and a further horizontal pipe (7) located on the bottom of the tank (4). The horizontal pipe (7) comprises various outlets equipped with eductor nozzles (8) which are equi-spaced and are inclined upwards (see especially FIG. 5). The tank is also equipped with a sensor and a sampling device (9) plunging below the upper surface (10) of the body of water. As shown by the dashed lines, the pumped liquid (A) flows through the valve (5), the vertical pipe (6) and the horizontal pipe (7). When the pumped liquid (A) exits via the nozzle part of the eductor nozzles (8), it draws liquid from the body of water through the eductor part of the eductor nozzles (8), corresponding to a flow of induced liquid (B). This induced liquid (B) joins the pumped liquid (A) and both exits the eductor nozzles as a total outlet flow (C).

The present invention is further illustrated below without limiting the scope thereto.

Should the disclosure of any patents, patent applications, and publications which are incorporated herein by reference conflict with the description of the present application to the extent that it might render a term unclear, the present description shall take precedence.

EXAMPLES

Example 1

The process of the present invention was tested on a well compartment of a well boat, having a length of 30 m, a width of 10 m and a height of 4 m and comprising 1000 $m^3$ of sea water (body of water) at about 12° C. In this example, no fish were present in the well during hydrogen peroxide dosing.

An agitation system of the SER-DUCTOR® type, commercialized by SERFILCO, designed according to FIGS. 3 to 5 and comprising eductor nozzles designed according to FIG. 1, was installed in the well compartment of the well boat. Said agitation system comprised a centrifugal pump located on the deck of the well boat, a submerged pipe located into the well and comprising around 40 outlets, each outlet being equipped with an eductor nozzle, and a pipe connecting the pump to the submerged pipe, said connecting pipe further comprising a flow meter to measure the flow of pumped liquid (A) sent to the body of water to be treated.

The deck of the well boat also comprised an iso-container of 25 $m^3$ containing hydrogen peroxide in the form of a 50 w/w aqueous solution (Tradename Interox Paramove 50). Said container was connected to the pump of the agitation system via a pipe. In the examples of the present invention, the pumped liquid (A) is the hydrogen peroxide solution contained in the container.

The eductor nozzles equipping the SER-DUCTOR® agitation system were such that the total outlet flow rate (C)

exiting each eductor nozzle was about 5 times the pumped liquid (A) flow rate at each outlet. Thus, for 1 liter of liquid pumped from the storage container (pumped liquid (A)) exiting an eductor nozzle, 4 liters of induced liquid (B) passed through the eductor part of the eductor nozzles and 5 liters of total outlet flow (C) exited the eductor nozzle, diluting the pumped liquid (A) and contributing to the agitation of the body of water.

The centrifugal pump was such that it allowed an outlet flow rate (C) of about 33 liters/min at each of the 40 outlets, corresponding to a total outlet flow rate (C) of about 1320 l/min for the whole agitation system; a flow rate of pumped liquid (A) of about 6.6 l/min at each outlet, a total flow rate of pumped liquid (A) of about 264 l/min; a flow rate of induced liquid (B) of about 26.4 l/min at each eductor nozzle, a total flow rate of induced liquid (B) of about 1056 l/min for the whole agitation system. The well compartment was also equipped with sensors for oxygen, pH and temperature and with a sampling device. The body of water was treated with hydrogen peroxide in an amount of 1500 ppm expressed as hydrogen peroxide per weight of the treated water. This amount corresponded to 3.0 $m^3$ of the 50 w/w hydrogen peroxide solution. Using the equipment of the present invention, the required amount of hydrogen peroxide was added in about 7.5 min to the body of water. The treatment was continued for 16.5 minutes then the treated water was flushed away and replaced by fresh seawater.

A sampling system was set up to permit sampling from 4 points on each of 3 lines running the length of the well (lines A, B and C). These lines were located at each side (A and C) and in the centre of the well (B) with the sample points along the length of each line designated as 1, 2, 3 and 4 (1 and 4 at both ends and 2 and 3 distributed in between). This allowed periodical removal of 12 samples in total (A1 to A4, B1 to B4 and C1 to C4) substantially at the same time. Samples were taken at 4 to 5 minutes intervals to record and monitor the concentration level of the hydrogen peroxide (mg/l) and to record, monitor and optionally control the other parameters such as the pH, the temperature and the oxygen level of the body of water. Sampling began at the time of the beginning of the addition of hydrogen peroxide and was stopped after the flushing of the treated water with fresh sea water. The hydrogen peroxide concentration of each sample was measured by titration using cerium sulphate. The results of the hydrogen peroxide measurements are summarized in Table 1 below.

The steps are defined as follows: "Add" corresponds to the addition of hydrogen peroxide (for 7.5 min), "Hold" corresponds to the treatment time (for 16.5 min after the end of the addition of the hydrogen peroxide, i.e. from 7.5 to 24 min), and "Flush" corresponds to the flushing of the treated water with fresh sea water.

The results of the hydrogen peroxide analysis shown in Table 1 demonstrate good dispersion and consistent concentrations of hydrogen peroxide at all sample points throughout the well water.

Example 2

Example 1 was repeated, except that the tank (well compartment) had a length of 30 m, a width of 5 m and a height of 4 m and comprised 500 $m^3$ of sea water. Again in this example, no fish were present in the well during hydrogen peroxide dosing.

The body of water was treated with hydrogen peroxide in an amount of 2000 ppm expressed as hydrogen peroxide per weight of the treated water. This amount corresponded to 2.0 $m^3$ of the 50% w/w hydrogen peroxide solution. Using the equipment of the present invention, the required amount of hydrogen peroxide was added in about 4.5 min to the body of water. The treatment was continued for 37.5 minutes then the treated water was flushed away and replaced by fresh seawater.

In this example, a sampling system was set up to permit sampling from 4 points on each of 4 lines running the length of the well (lines A to D). These lines were located at each side (A and D) and in the centre of the well (B and C) with the sample points along the length of each line designated as 1, 2, 3 and 4 (1 and 4 at both ends and 2 and 3 distributed in between). This allowed periodical removal of 16 samples in total (A1 to A4, B1 to B4, C1 to C4 and D1 to D4) substantially at the same time. Samples were taken at intervals to record and monitor the concentration level of the hydrogen peroxide (mg/l) and to record, monitor and optionally control the other parameters such as the pH, the temperature and the oxygen level of the body of water.

Sampling began at the time of the beginning of the addition of hydrogen peroxide and was stopped after the flushing of the treated water with fresh sea water. The results of the hydrogen peroxide measurements are summarized in Table 2 below.

TABLE 1

| | Hydrogen peroxide level (mg/l) | | | | | | | |
| | Time | | | | | | | |
| | 3 min. | 7 min. | 11 min. | 15 min. | 19 min. | 24 min. | 29 min. | 34 min. |
| | Step | | | | | | | |
| Samples | Add | Add | Hold | Hold | Hold | Hold | Flush | Flush |
| --- | --- | --- | --- | --- | --- | --- | --- | --- |
| A1 | 335 | 797 | 1275 | 1500 | 1275 | 1342 | 1342 | 319 |
| A2 | 327 | 851 | 1342 | 1500 | 1342 | 1342 | 1214 | 302 |
| A3 | 364 | 911 | 1159 | 1500 | 1500 | 1417 | 1275 | 708 |
| A4 | 367 | 1063 | 1109 | 1342 | 1417 | 1342 | 1342 | 773 |
| B1 | 335 | 823 | 1500 | 1342 | 1275 | 1275 | 815 | 325 |
| B2 | 773 | 911 | 1342 | 1594 | 1342 | 1417 | 815 | 447 |
| B3 | 327 | 981 | 1342 | 1417 | 1342 | 1417 | 1139 | 349 |
| B4 | 425 | 531 | 1109 | 1342 | 1417 | 1417 | 1214 | 631 |
| C1 | 375 | 685 | 1417 | 1417 | 1417 | 1275 | 1275 | 386 |
| C2 | 815 | 654 | 1275 | 1417 | 1342 | 1275 | 1275 | 354 |
| C3 | 345 | 815 | 1109 | 1417 | 1342 | 1342 | 797 | 638 |
| C4 | 638 | 654 | 1063 | 1342 | 1417 | 1342 | 1063 | 944 |

TABLE 2

| Samples | Hydrogen peroxide level (mg/l) Time | | | | | | | |
|---|---|---|---|---|---|---|---|---|
| | 2 min. | 6 min. | 10 min. | 15 min. | 20 min. | 32 min. | 36 min. | 47 min. |
| | | | | | Step | | | |
| | Add | Add/ Hold | Hold | Hold | Hold | Hold | Hold | Hold/ Flush |
| A1 | 319 | 319 | 1700 | 1700 | 1821 | 1821 | 1821 | 1275 |
| A2 | 319 | 879 | 1821 | 1821 | 1821 | 1821 | 1821 | 1417 |
| A3 | 319 | 750 | 1417 | 1821 | 1700 | 1821 | 1821 | 1417 |
| A4 | 319 | 1962 | 2318 | 1821 | 1821 | 1821 | 1821 | 1417 |
| B1 | 364 | 1159 | 1700 | 1962 | 1821 | 1821 | 1821 | 1275 |
| B2 | 319 | 981 | 1821 | 1821 | 1821 | 1821 | 1821 | 1342 |
| B3 | 319 | 1159 | 1594 | 1821 | 1700 | 1821 | 1821 | 1594 |
| B4 | 425 | 1700 | 1594 | 1962 | 1821 | 1821 | 1821 | 1500 |
| C1 | 319 | 1109 | 1594 | 1962 | 1821 | 1821 | 1821 | 1275 |
| C2 | 319 | 1063 | 1821 | 1821 | 1821 | 1821 | 1821 | 1214 |
| C3 | 708 | 750 | 1417 | 1821 | 1821 | 1821 | 1821 | 1417 |
| C4 | 729 | 1500 | 2125 | 1962 | 1821 | 1821 | 1821 | 1342 |
| D1 | 319 | 671 | 1594 | 1962 | 1821 | 1821 | 1821 | 1275 |
| D2 | 319 | 1109 | 1962 | 1962 | 1821 | 1821 | 1821 | 1275 |
| D3 | 689 | 2318 | 1821 | 1962 | 1962 | 1821 | 1821 | 1417 |
| D4 | 319 | 1962 | 1962 | 1821 | 1962 | 1821 | 1821 | 1342 |

The steps are defined as follows: "Add" corresponds to the addition of hydrogen peroxide (for 4.5 min), "Hold" corresponds to the treatment time (for 37.5 min after the end of the addition of the hydrogen peroxide, i.e. from 4.5 to 42 min), and "Flush" corresponds to the flushing of the treated water with fresh sea water.

The results of the hydrogen peroxide analysis shown in Table 2 demonstrate good dispersion and consistent concentrations of hydrogen peroxide at all sample points throughout the well water.

Example 3

The same well size as Example 2 was used with sample points A1-A4 and C1-C4 corresponding to the same locations as Example 2. The body of water was treated with hydrogen peroxide in an amount of 1500 ppm expressed as hydrogen peroxide per weight of the treated water. This amount corresponded to 1.5 m$^3$ of the 50 w/w hydrogen peroxide solution. Using the equipment of the present invention, the required amount of hydrogen peroxide was added in about 4.5 min to the body of water. The treatment was continued for 22.5 minutes then the treated water was flushed away and replaced by fresh seawater.

In Example 3, the body of water comprised additionally Atlantic salmons as living organisms, said salmons being infested with external parasites, i.e. salmon lice (*Lepeophtheirus salmonis*). The purpose of the test was to remove these parasites from the fish.

Sampling began at the time of the beginning of the addition of hydrogen peroxide and was stopped after the flushing of the treated water with fresh sea water. The results of the hydrogen peroxide measurements are summarized in Table 3 below.

TABLE 3

| Samples | Hydrogen peroxide level (mg/l) Time | | | | | | | | | |
|---|---|---|---|---|---|---|---|---|---|---|
| | 2 min. | 4 min. | 7 min. | 9 min. | 14 min. | 16 min. | 19 min. | 22 min. | 24 min. | 27 min. |
| | | | | | Step | | | | | |
| | Add | Add | Add/ Hold | Hold | Hold | Hold | Hold | Hold | Hold | Flush |
| A1 | 364 | 375 | 1063 | 1159 | 1342 | 1342 | 1417 | 1417 | 1417 | 1063 |
| A2 | 364 | 425 | 1214 | 1214 | 1342 | 1342 | 1417 | 1417 | 1417 | 1063 |
| A3 | 364 | 580 | 1214 | 1159 | 1342 | 1342 | 1417 | 1417 | 1417 | 1063 |
| A4 | 386 | 850 | 1500 | 1342 | 1500 | 1417 | 1417 | 1417 | 1417 | 345 |
| C1 | 345 | 1063 | 1109 | 1275 | 1342 | 1342 | 1342 | 1417 | 1342 | 911 |
| C2 | 364 | 580 | 1063 | 1214 | 1342 | 1417 | 1417 | 1342 | 1417 | 944 |
| C3 | 593 | 607 | 1063 | 1159 | 1342 | 1342 | 1275 | 1417 | 1342 | 1063 |
| C4 | 911 | 1063 | 1063 | 1342 | 1417 | 1342 | 1342 | 1417 | 1275 | 729 |

The steps are defined as follows: "Add" corresponds to the addition of hydrogen peroxide (for 4.5 min), "Hold" corresponds to the treatment time (for 22.5 min after the end of the addition of the hydrogen peroxide, i.e. from 4.5 to 27 min), and "Flush" corresponds to the flushing of the treated water with fresh sea water.

The results of the hydrogen peroxide analysis shown in Table 3 demonstrate good dispersion and consistent concentrations of hydrogen peroxide at all the sample points in the well water. The agitation system of the present invention allowed a quick mixing of the hydrogen peroxide without injuring the fish. The treatment was effective in removing the salmon lice from the treated fish.

The invention claimed is:

1. A process for treating with at least one chemical compound a body of water comprising at least one living organism selected from the group consisting of fish, mollusks, crustaceans and aquatic plants, said process comprising adding said at least one chemical compound to the body of water and agitating the water with an agitation system, wherein
said agitation system comprises a centrifugal pump located on the deck of a well boat, at least one submerged pipe located into the well, and several outlets, wherein
each said outlet is equipped with an eductor nozzle, and a connecting pipe connecting said centrifugal pump to said submerged pipe, wherein
said connecting pipe comprises a flow meter to measure the flow of a pumped liquid (A) sent to the body of water to be treated, and wherein
said eductor nozzle comprises:
a nozzle part (1) through which exits said liquid (A) pumped through the agitation system via the centrifugal pump, wherein said liquid (A) comprises the chemical compound
an eductor part (3a) through which part of the water present in the body of water to be treated is sucked, via at least one suction opening (2b), said sucked water flow being called induced liquid (B), and
a diffuser part (3b) in which the pumped liquid (A) and the induced liquid (B) are mixed and exit from the agitation system in the form of a total outlet flow (C),
wherein the eductor nozzle is such that the total outlet flow (C) exiting the eductor nozzle is from 4 to 6 times greater than the pumped liquid (A) flow rate exiting the nozzle part of the eductor nozzle.

2. The process according to claim 1, wherein the agitation system comprises more than one submerged outlet equipped with an eductor nozzle, per square meter of the upper surface area of the body of water to be treated.

3. The process according to claim 1, wherein the body of water is a substantially enclosed water system.

4. The process according to claim 1, wherein the pump is located out of the body of water to be treated, and wherein the pumped liquid (A) is withdrawn from a liquid contained in a storage container or in a dosing chamber, or combinations thereof.

5. The process according to claim 1, being applied to a body of water having a volume from 0.5 $m^3$ to 10000 $m^3$.

6. The process according to claim 1, wherein the at least one chemical compound is selected from the group consisting of microbicides, bactericides, viricides, parasiticides, fungicides, algaecides, and combinations thereof.

7. The process according to claim 1, wherein the at least one chemical compound is selected from the group consisting of hydrogen peroxide, sodium percarbonate, calcium peroxide, magnesium peroxide, mixed calcium-magnesium peroxide, ε-phthalimido-peroxy-hexanoic-acid (PAP), sodium perborate monohydrate, sodium perborate tetrahydrates, urea hydrogen peroxide, organo phosphates, pyrethroids, peracetic acid, and mixtures thereof.

8. The process according to claim 1, wherein the agitation system comprises dosing means for adding the at least one chemical compound to prior to sending the pumped liquid to the body of water to be treated, the dosing means comprising:
a storage container containing the at least one chemical compound, and
a supply line which connects the storage container to a pipe comprising the pumped liquid, said supply line optionally comprising an adjustable flow control valve,
the storage container and the supply line being optionally connected together via a dosing chamber.

9. The process according to claim 1, wherein the agitation system is combined with an in-line monitoring system comprising a sensor and/or a sampling device located inside the body of water to be treated.

10. The process according to claim 1, being applied in aquaculture.

11. The process according to claim 1, being applied in fish farming.

12. The process according to claim 1, wherein said at least one submerged pipe is a vertical pipe and a further horizontal pipe located on the bottom of the well, said horizontal pipe comprising various outlets equipped with eductor nozzles; and wherein the well is also equipped with a sensor and a sampling device.

* * * * *